(12) United States Patent
Gilmore et al.

(10) Patent No.: US 7,889,830 B2
(45) Date of Patent: Feb. 15, 2011

(54) NUCLEAR REACTOR DOWNCOMER FLOW DEFLECTOR

(75) Inventors: Charles B. Gilmore, Greensburg, PA (US); David A. Altman, Pittsburgh, PA (US); Norman R. Singleton, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 758 days.

(21) Appl. No.: 11/745,600

(22) Filed: May 8, 2007

(65) Prior Publication Data

US 2008/0279326 A1 Nov. 13, 2008

(51) Int. Cl.
G21C 3/34 (2006.01)
G21C 9/00 (2006.01)
(52) U.S. Cl. .................. 376/439; 376/282; 376/294
(58) Field of Classification Search .................. 376/439, 376/294, 282
See application file for complete search history.

(56) References Cited

U.S. PATENT DOCUMENTS

| 4,019,955 | A | * | 4/1977 | Grubelich | 376/283 |
| 4,576,778 | A | * | 3/1986 | Ferree et al. | 376/203 |
| 5,259,008 | A | | 11/1993 | Schultz | |
| 5,460,045 | A | * | 10/1995 | Clark et al. | 73/622 |
| 6,928,133 | B2 | * | 8/2005 | Kwon et al. | 376/282 |

OTHER PUBLICATIONS

J-Groove Edge Prep Comes Easy With ACA Soisson, L; Henderson, J. Weld. Des. Fabr. vol. 56, No. 7, oo.53-55. Jul. 1993.*
Tubular Structures by Jeffery A. Parker, Silke Willibald, International Institute of Welding, Published 2006, p. 569 out of 684 pages.*
Soisson et al, Weld. Des. Fabr. vol. 56 No. 7, pp. 53-55 Jul. 1993.

* cited by examiner

Primary Examiner—Rick Palabrica
Assistant Examiner—Erin M B Leach

(57) ABSTRACT

A nuclear reactor having a coolant flow deflector secured to a reactor core barrel in line with a coolant inlet nozzle. The flow deflector redirects incoming coolant down an annulus between the core barrel and the reactor vessel. The deflector has a main body with a front side facing the fluid inlet nozzle and a rear side facing the core barrel. The rear side of the main body has at least one protrusion secured to the core barrel so that a gap exists between the rear side of the main body adjacent the protrusion and the core barrel. Preferably, the protrusion is a relief that circumscribes the rear side of the main body.

17 Claims, 8 Drawing Sheets

NUCLEAR REACTOR DOWNCOMER FLOW DEFLECTOR

GOVERNMENT INTEREST

This invention was made with Government support under Contract No. DE-FC07-05ID14636 awarded by the Department of Energy. The Government has certain rights in this invention.

BACKGROUND OF THE INVENTION

1. Field of the Invention

This invention relates to water-cooled nuclear reactors and more particularly to pressurized water reactors having direct vessel injection.

2. Description of Related Art

The primary side of nuclear reactor power generating systems which are cooled with water under pressure comprises a closed circuit which is isolated from and in heat exchange relationship with a secondary side for the production of useful energy. The primary side comprises the reactor vessel enclosing a core comprised of a plurality of fuel assemblies containing fissile material, the primary circuit within heat exchange steam generators, the inner volume of a pressurizer and pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side. The primary side is also connected to auxiliary circuits, including a circuit for volumetric and chemical adjustment of the pressurized water. This auxiliary circuit, which is arranged branching on the primary circuit, makes it possible to maintain the quantity of water in the primary circuit by replenishing, when required, with measured quantities of water and to monitor the chemical properties of the coolant water, particularly its content of boric acid which is important to the operation of the reactor. During the periods when the chemical properties of the water are adjusted, it may be necessary to carry out tappings or injections into the primary circuit. Outside these periods of injections or tappings, the valves connecting auxiliary circuits, other than the circuit for volumetric or chemical control to the primary side, are closed. The primary side is then theoretically isolated and completely sealed, with the result that the quantity of water in the primary side is theoretically constant.

In practice, however, it is observed that this quantity of cooling water diminishes during the operation of the reactor, as a consequence of unavoidable leaks. It is important to maintain the level of coolant within the core, and when makeup water is required, in some nuclear reactor system designs it is directly injected through direct vessel injection nozzles into the reactor vessel in the downcomer between the reactor vessel and the core barrel. A deflector attached to the core barrel in line with the direct vessel injection nozzle directs the incoming water down the downcomer to the bottom of the vessel where it changes direction and is directed up through the lower core support plate to the core. The incoming water entering through the direct vessel injection nozzle is at approximately 50° F. (10° C.). Prior to a direct vessel injection transient, the direct vessel injection flow deflector has a uniform temperature consistent with the reactor cooling system cold leg temperature, which is approximately 535° F. (279° C.). At the onset of the direct vessel injection transient, the direct vessel injection flow deflector interior surfaces cool almost instantaneously to 50° F. (10° C.). As a result of the direct vessel injection transients, the flow deflector experiences a significant amount of contraction because of rapid cooling. For existing plants having direct vessel injection, the flow deflector can best be described as a (solid) rectangular plate or block with a machined groove extending just below a top lip (74) to the bottom of the plate. The machined groove turns the direct vessel injection flow down into the reactor pressure vessel core barrel annulus between the pressure vessel and the core barrel.

Since the flow deflector can be characterized as a solid block, one side of the weld (that is, the "heel" of the fillet weld) is constrained to follow the contraction of the block surface of the deflector. The "toe" of the weld remains in contact with the outside diameter of the core barrel. The average temperature of the core barrel, approximately 580° F. (304° C.), is significantly higher than the direct vessel injection flow deflector during the direct vessel injection transient. Therefore, during the direct vessel injection transient, the "throat" of the weld experiences a significant amount of "shear action." This "shear action" is necessary to accommodate the differential strain between the direct vessel injection flow deflector and the core barrel. As a result, high stresses are anticipated for the weld.

New reactor designs, such as the AP1000 reactor design offered by Westinghouse Electric Company LLC, anticipate an increased number of occurrences of direct vessel injection system transients. The direct vessel injection connections are used to reduce the side effects of accidents caused by reactor coolant system pipe breaks. In plants that do not use direct vessel injection connections, core make-up water is introduced through the cold leg piping. A break of a main coolant loop pipe will cause spillage of safety injection flow. For the AP1000 with direct vessel injection, breaks of the main coolant loop piping will not cause any safety injection spillage.

Previous plants that used direct injection nozzles were two loop plants that used them only for safety injection. The direct vessel injection nozzles on the AP1000 are connected to the core makeup tank for safety injection and to the in-containment refueling water storage tank drain lines, accumulators, and shut down cooling pumps. These additional connections add significant transients to the direct vessel injection nozzle and deflector. These transients are anticipated to set up high stresses that can result in an unacceptable fatigue life of the fillet weld attaching the flow deflector to the core barrel. The current weld design attaching the flow deflector to the core barrel will not likely accommodate the relative differential expansion of the flow deflector and core barrel over an increased number of injection transients, because of the inherently "stiff" characteristics of the mating surfaces.

Accordingly, a new flow deflector to core barrel interface is desired that can better accommodate the stresses set up by the rapid cooling of the flow deflector during a direct vessel injection transient.

SUMMARY OF THE INVENTION

This invention achieves the foregoing objective by providing a nuclear reactor having a pressure vessel with a fluid inlet nozzle extending through the wall of the pressure vessel. An internal support structure is supported within the pressure vessel in spaced relationship with and opposite to an interior side of the pressure vessel inlet nozzle. A deflector is positioned between the internal support structure and the fluid inlet nozzle, inline with the inlet nozzle, for deflecting fluid flowing through the inlet nozzle into the pressure vessel. The deflector has a main body with a front side facing the fluid inlet nozzle and a rear side facing the internal support structure. The rear side of the main body has at least one protrusion affixed to the internal support structure, so that a gap exists between the rear side of the main body adjacent the protrusion and the internal support structure. Preferably, the protrusion has a weld preparation or "prep" that is welded to the internal support structure with a full penetration weld. Preferably, a reinforcing weld is laid over the full penetration weld, in a pressurized water reactor, the internal support structure is the core barrel.

In one embodiment, the protrusion comprises a machined relief that extends around a periphery of the rear side of the main body and may have a vent hole either through one or the other, or both, of the internal support structure and main body.

In another preferred embodiment, the deflector is a metal block having an axial groove machined into its front side extending from below a top surface of the metal block to and through a bottom of the metal block. Desirably, the periphery of the metal block is substantially round. In another preferred embodiment, the rear side of the deflector has a groove adjacent the protrusion to add flexibility between the protrusion and the rear side of the deflector. Desirably, the groove is annular and extends around the main body inside the protrusion.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
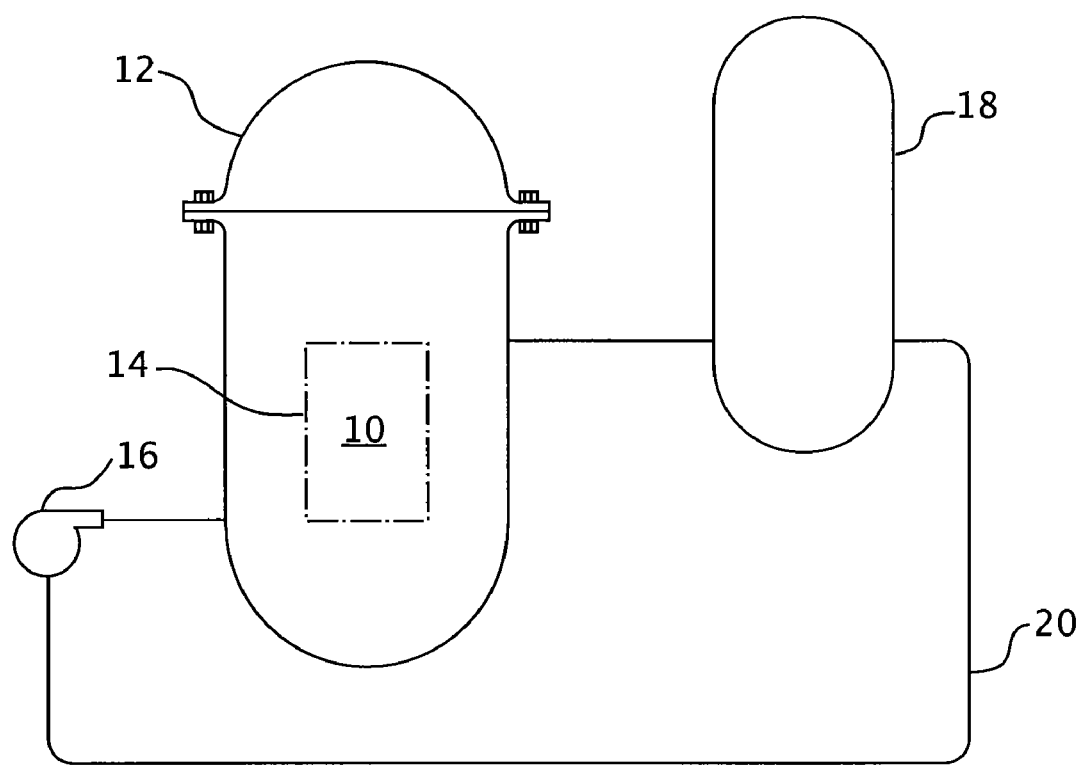
FIG. 1 is a simplified schematic of a nuclear reactor system to which this invention may be applied.

Referring now to the drawings FIG. 1 shows a simplified nuclear reactor primary system, including a generally cylindrical reactor pressure vessel (10) having a closure head (12) enclosing a nuclear core (14). A liquid reactor coolant such as water, is pumped into the vessel (10) by pump (16) through the core (14) where heat energy is absorbed and is discharged to a heat exchanger (18), typically referred to as a steam generator, in which heat is transferred to a utilization circuit (not shown), such as a steam-driven turbine generator. The reactor coolant is then returned to the pump (16), completing the primary loop. Typically, a plurality of the above-described loops are connected to a single reactor vessel (10) by reactor coolant piping (20).

Figure 2:
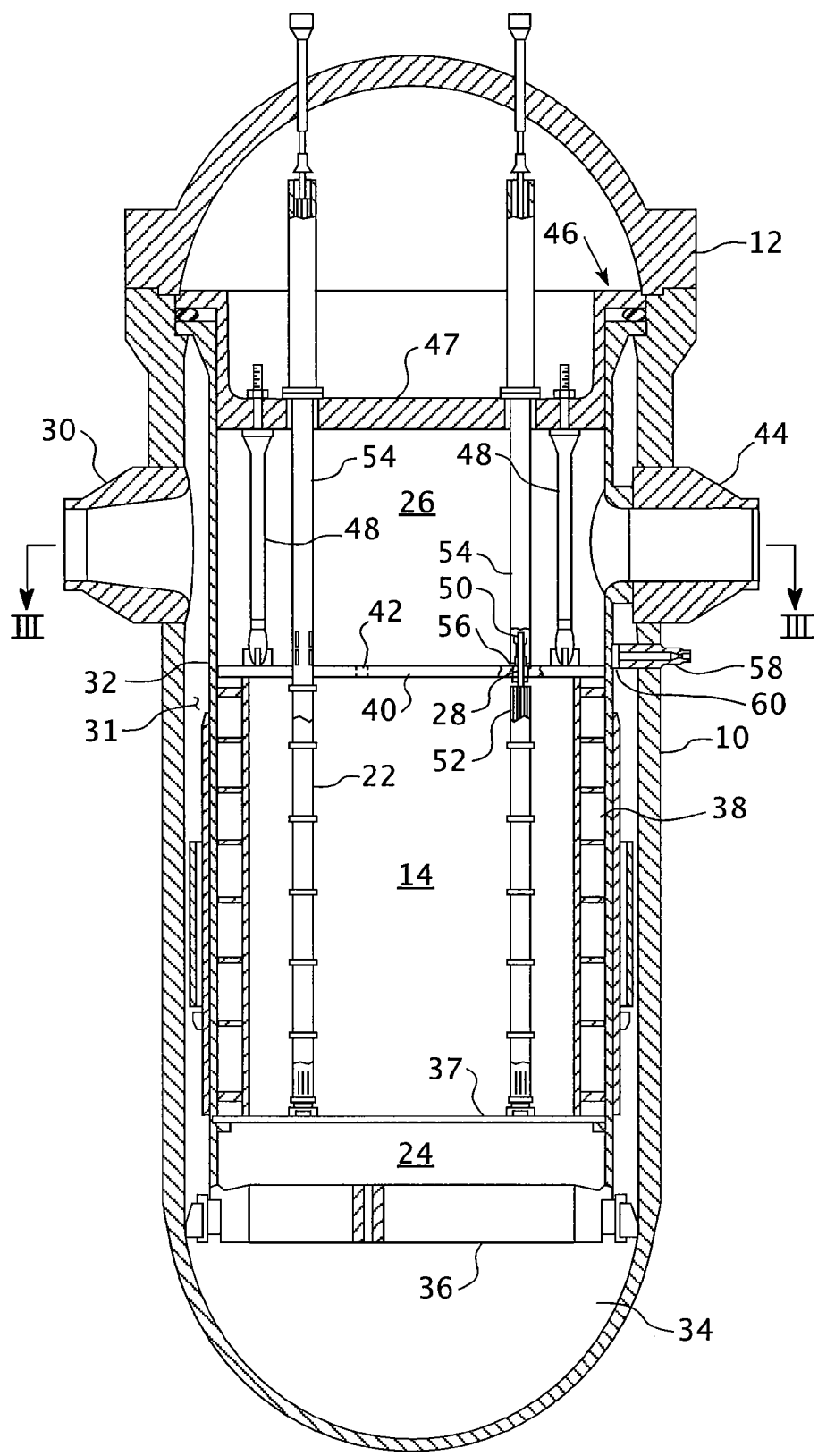
FIG. 2 is an elevational view, partially in section, of a nuclear reactor vessel and internal components to which this invention may be applied.

An exemplary reactor design is shown in more detail in FIG. 2. In addition to a core (14) comprised of a plurality of parallel, vertical co-extending fuel assemblies (22), for purposes of this description, the other vessel internal structures can be divided into the lower internals (24) and the upper internals (26). In conventional designs, the lower internals function to support, align and guide the core, core components and instrumentation, as well as to direct flow within the vessel. The upper internals restrain or provide a secondary restraint for the fuel assemblies (22) (only two of which are shown for simplicity) and support and guide instrumentation and components such as control rods (28).

In the exemplary reactor shown in FIG. 2 coolant enters the vessel (10) through one or more inlet nozzles (30), flows downward about a core barrel (32), is turned 180° in a lower plenum (34), passes upwardly through a lower support plate (36) and lower core plate (37) upon which the fuel assemblies (22) are seated, and through and about the assemblies. In some designs, the lower support plate (36) and lower core plate (37) are combined into a single lower core support plate (at the same location as 36), which eliminates the separate lower core plate (37). The coolant flow through the core and surrounding area (38) is typically large, in the order of 400,000 gallons per minute at a velocity of approximately 20 feet per second. The resulting pressure drop and frictional forces tend to cause the fuel assemblies to rise, which movement is restrained by the upper internals, including a circular upper core plate (40). Coolant exiting the core (14) flows along the underside of the upper core plate (40) and upwardly through a plurality of perforations (42). The coolant then flows upwardly and radially to one or more outlet nozzles (44).

The upper internals (26) can be supported from the vessel and include an upper support assembly (46). Loads are transmitted between the upper support plate (47) of the upper support assembly (46) and the upper core plate (40), primarily by a plurality of support columns (48). A support column is aligned above a selected fuel assembly (22) and perforation (42) in the upper core plate (40).

Rectilinearly moveable control rods (28), typically including a drive shaft (50) and a spider assembly (52) of neutron poison rods, are guided through the upper internals (26) and into aligned fuel assemblies (22) by control rod guide tubes (54). The guide tubes are fixedly joined to the upper support assembly (46) and connected by a split pin (56) force fit into the top of the upper core plate (40). The support columns (48) assist in retarding guide tube deformation under seismic and design basis accident conditions which could detrimentally affect control rod insertion capability.

In accordance with this invention, the reactor pressure vessel (10) is provided with a direct vessel injection nozzle (58) that communicates water from a makeup tank to the annulus (31) between the core barrel (32) and the interior of the pressure vessel (10). A flow deflector (60) is welded to the exterior of the core barrel (32) in line with the outlet of the direct vessel injection nozzle (58) so that the makeup water impinging on the flow deflector (60) is redirected downward to the lower plenum (34).

Figure 3:
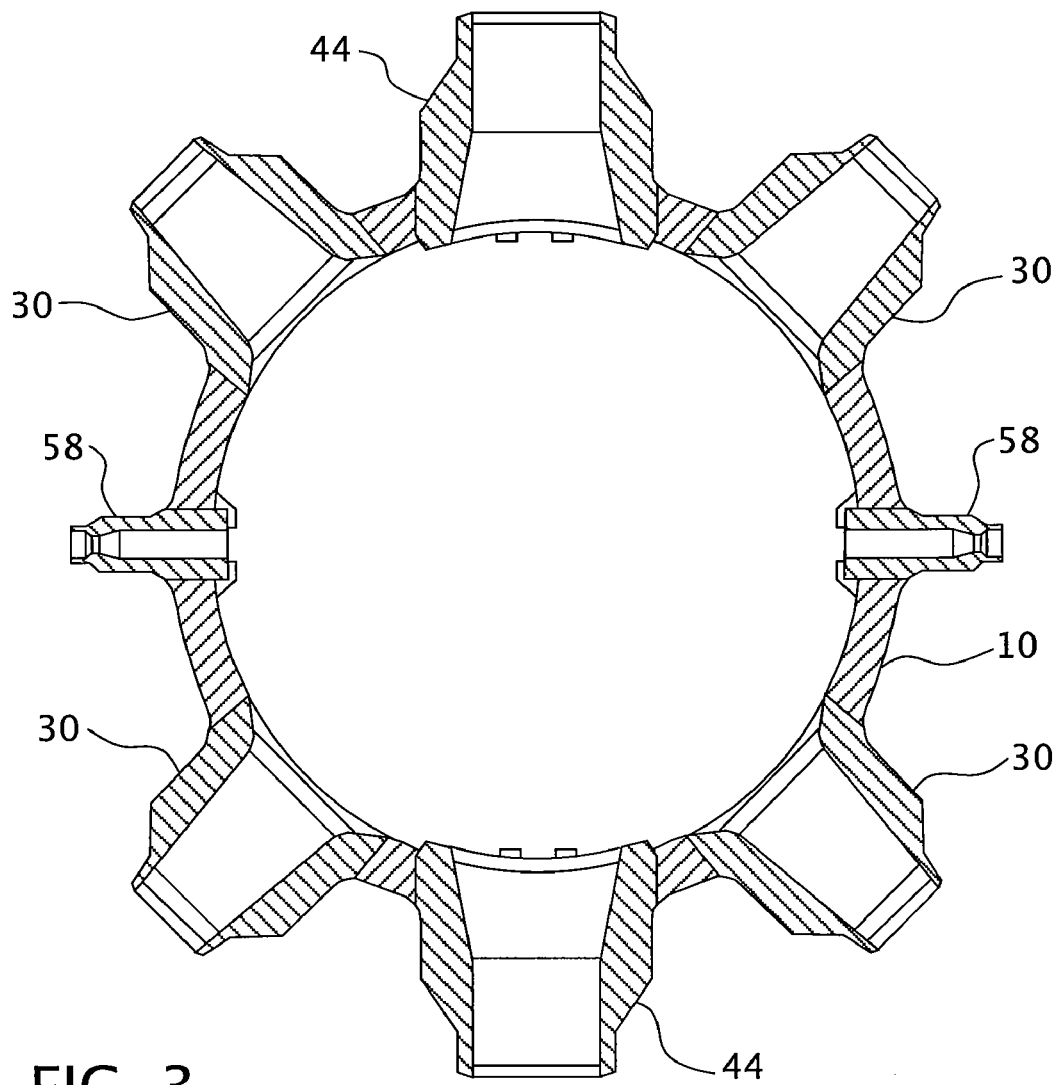
FIG. 3 is a top cross-sectional view of the reactor vessel of FIG. 2 taken along the lines III-III thereof (with a lower cross-section taken at the circumferential locations of the direct vessel injection nozzles for the purpose of illustration)

FIG. 3 is a top cross-sectional view taken along the lines III-III of FIG. 2 which shows the reactor vessel with two diametrically opposed direct vessel injection nozzles (58), and for each of two steam generator loops, one outlet nozzle (44) and two inlet nozzles (30). In FIG. 3, the reactor vessel (10) is shown with the core barrel removed. As can be appreciated from FIG. 5 the cross-section in FIG. 3, at the circumferential locations of the direct vessel injection nozzles, is taken at a lower elevation than III-III of FIG. 2 for the purpose of illustration.

Figure 4:
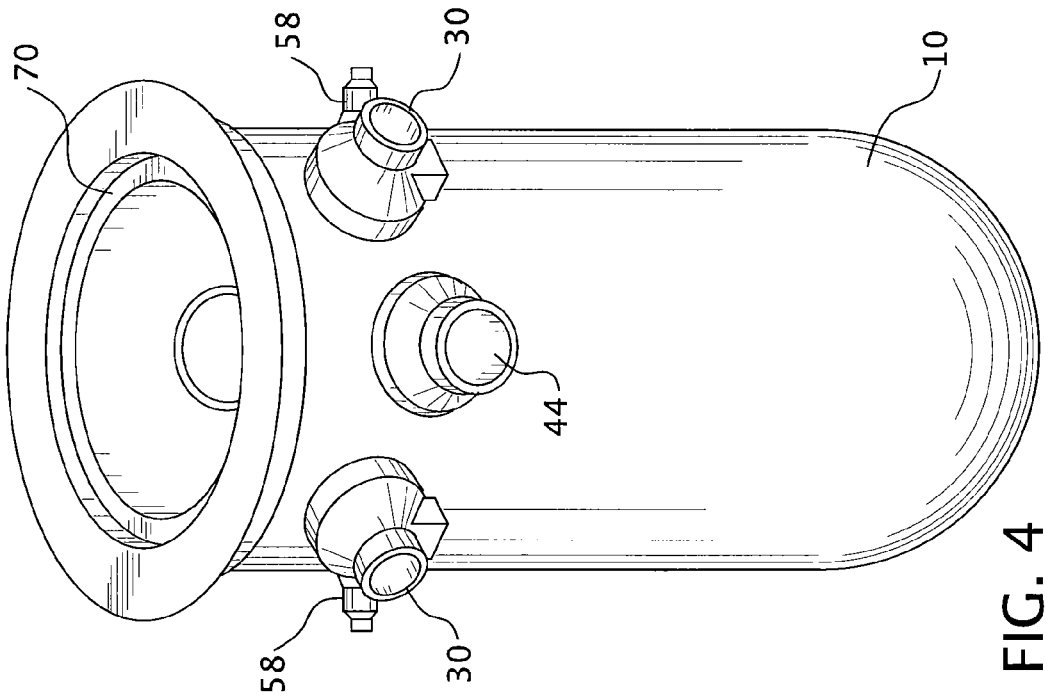
FIG. 4 is a perspective view of the reactor vessel of FIGS. 2 and 3.

FIG. 4 shows a perspective view of the reactor pressure vessel, providing an outside view of the direct vessel injection nozzles (58) diametrically spaced around the pressure vessel, with two inlet nozzles (30) and an outlet nozzle (44) showing on the outside of the vessel (10), while the second outlet nozzle can be viewed partially from the interior of the vessel. Two corresponding inlet nozzles are not shown in this view. The core barrel is shown separately in FIG. 5.

Figure 5:
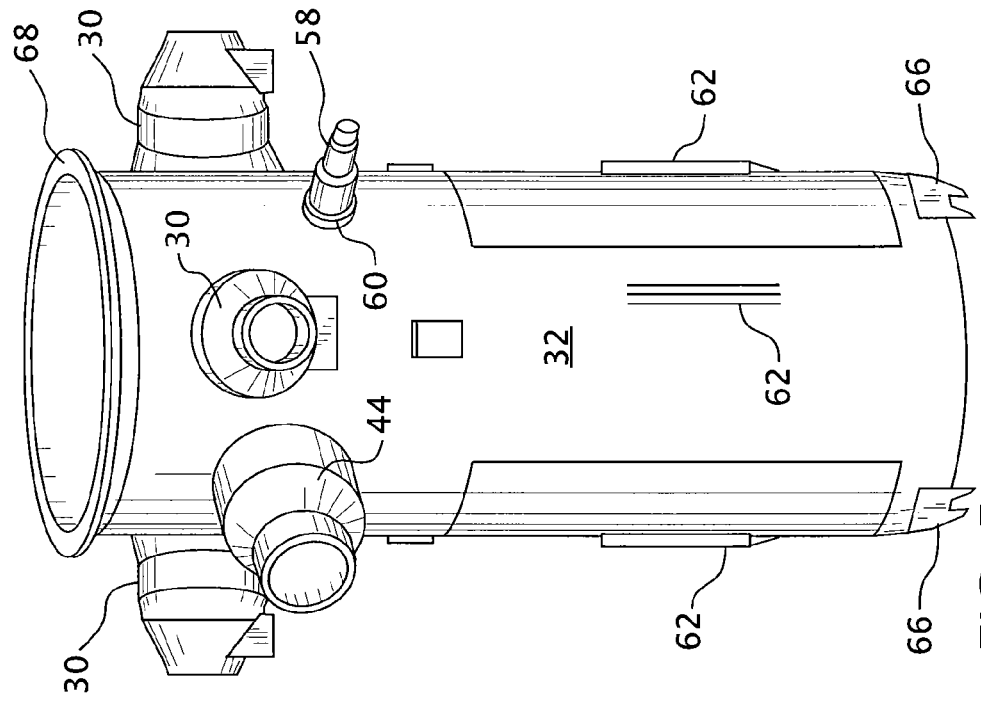
FIG. 5 is a perspective view of the core barrel shown in cross-section in FIG. 2 with the pressure vessel nozzles superimposed on the core barrel to figuratively show the corresponding orientation of the pressure vessel nozzles to the core barrel.

In FIG. 5 the reactor pressure vessel inlet nozzles (30), outlet nozzles (44) are shown superimposed on the core barrel for the purposes of illustration to help visualize how they mate-up with the corresponding nozzles on the core barrel (32). Similarly, the direct vessel injection nozzle (58) is also shown, positioned adjacent the flow deflector (60). The core barrel (32) has a flange (68) that rests and is supported on an upper ledge (70) within the reactor pressure vessel (10) shown in FIG. 4. The core barrel (32) shown in FIG. 5 also has conventional radial keys (66) for orienting the core barrel within the pressure vessel (10). As in conventional nuclear reactor plants, the core barrel (32) also has specimen baskets (62) from which samples of the reactor vessel material can be taken periodically to check for radiation embrittlement.

Figure 6:
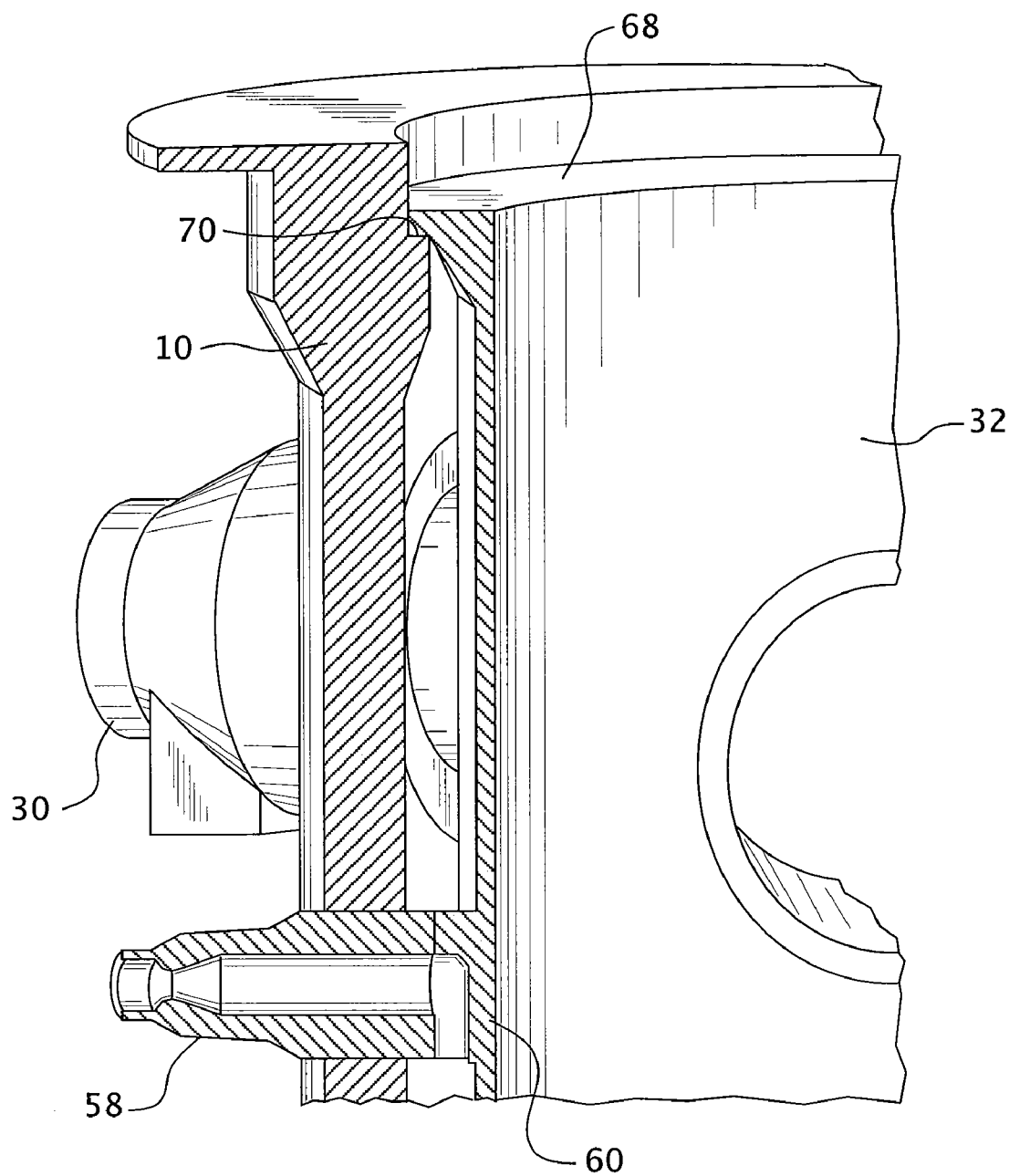
FIG. 6 is a perspective view of a partial quarter-section of the reactor vessel, with the core barrel in position showing the direct vessel injection nozzle and flow deflector in section.

FIG. 6 shows a perspective view of a partial quarter cross-section of the reactor pressure vessel (10) and core barrel (32) assembly with the core barrel flange (68) resting on the pressure vessel ledge (70). FIG. 6 provides an excellent view of the direct vessel injection nozzle (58) coupling with the deflector (60) of this invention.

Figure 7:
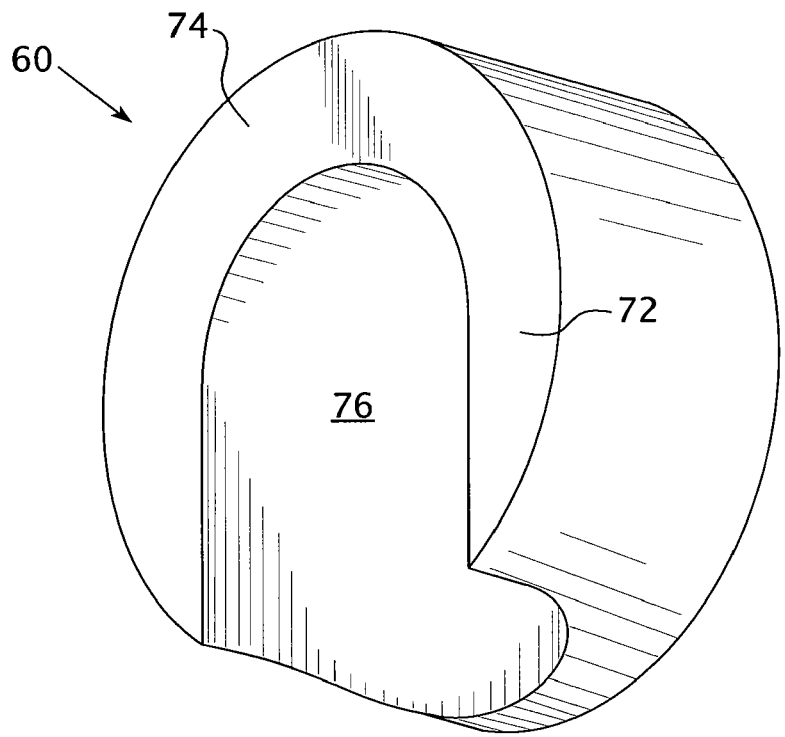
FIG. 7 is a perspective front view of the flow deflector of this invention.

FIG. 7 shows a front perspective view of the deflector plate (60) of this invention. The direct vessel injection flow deflector can be characterized as a solid cylinder of metal such as stainless steel that has a groove (76) machined in its front face (72) just below a top lip (74). The groove (76) extends from the top lip downward through the bottom of the front face (72). The width of the groove (76) matches up with the flow diameter of the direct vessel injection nozzle (58) in the pressure vessel (10) at an elevation just below the top lip (74). The groove (76) redirects the water coming out of the nozzle (58) downward through the annulus (31) between the core barrel and the pressure vessel to the lower plenum (34) below the core.

Figure 8:
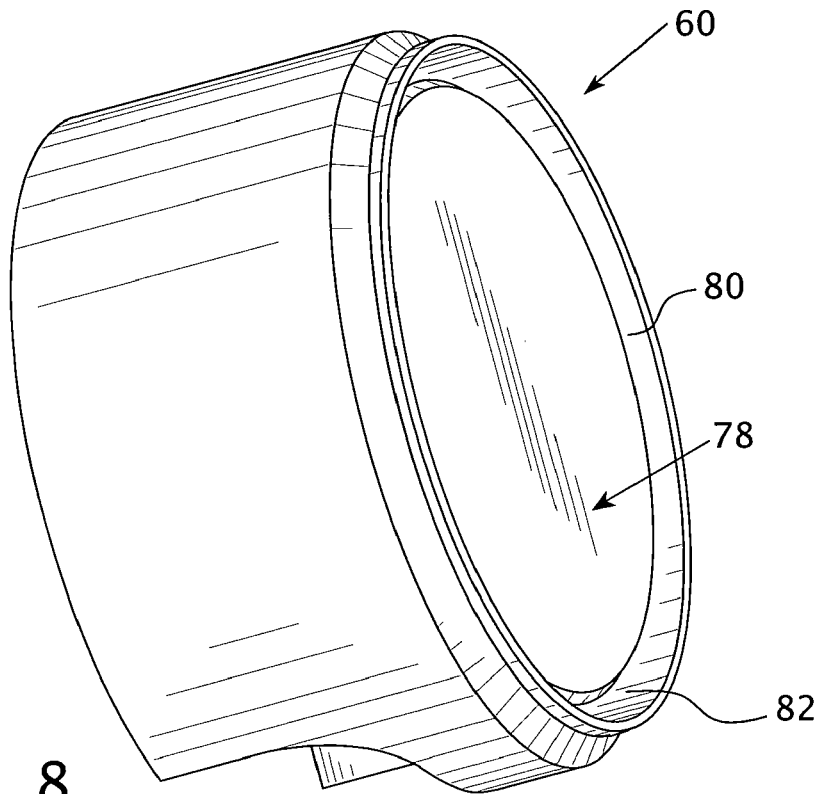
FIG. 8 is a perspective side and rear view of the flow deflector of this invention.
Figure 11:
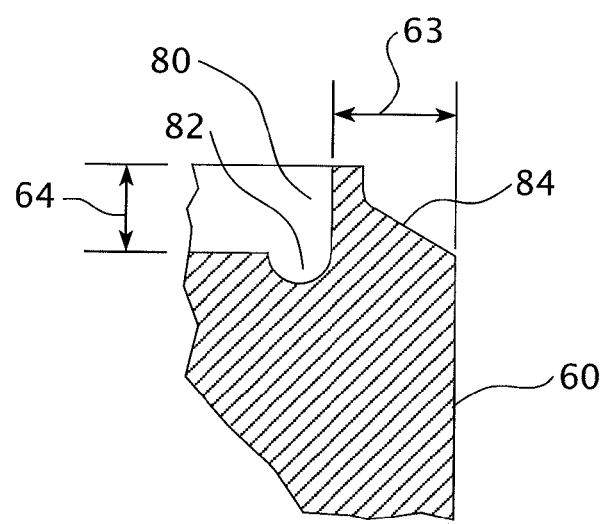
FIG. 11 is a sectional view of a portion of the weld preparation employed to couple the back side of the flow deflector of this invention to the core barrel.

FIG. 8 shows a perspective side and rear view of the flow deflector (60). The rear (78) of the flow deflector (60) preferably includes a machined relief (80) that protrudes 0.346" (0.88 cm) and circumscribes the backside of the deflector (78). The standoff distance (64) previously noted as 0.346" (0.88 cm) and shown in FIG. 11, is the distance between the central rear region of the flow deflector (78) and the core barrel when the flow deflector (60) is affixed to the core barrel (32). The machined relief (80) provides flexibility between the weld that connects the flow deflector (60) to the barrel (32). This relief is unique in that for all weld locations, the flexibility afforded by the 0.346" (0.88 cm) offset can be considered to be constant.

Figure 9:
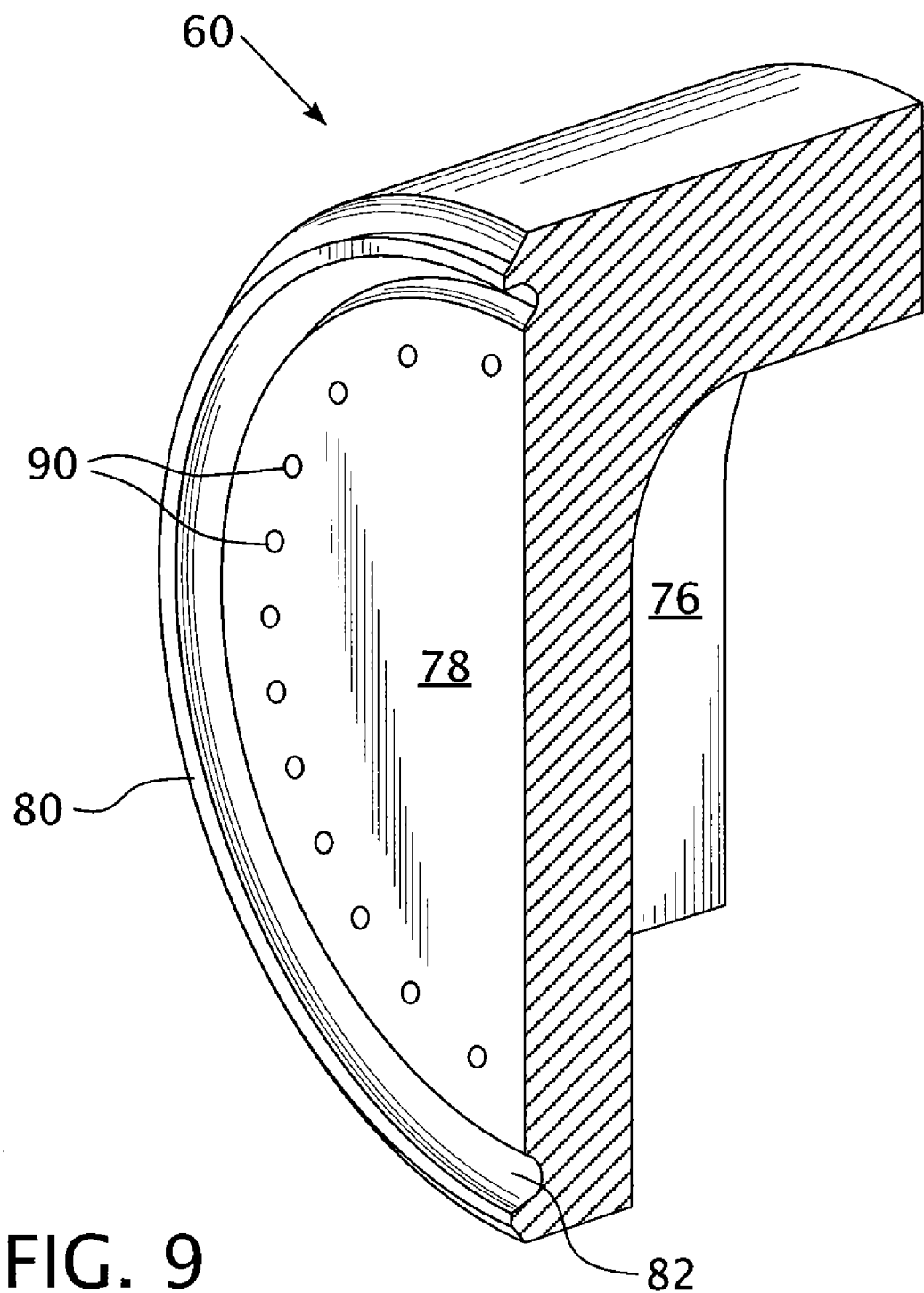
FIG. 9 is a perspective rear-sectional view of the flow deflector of this invention.
Figure 10:
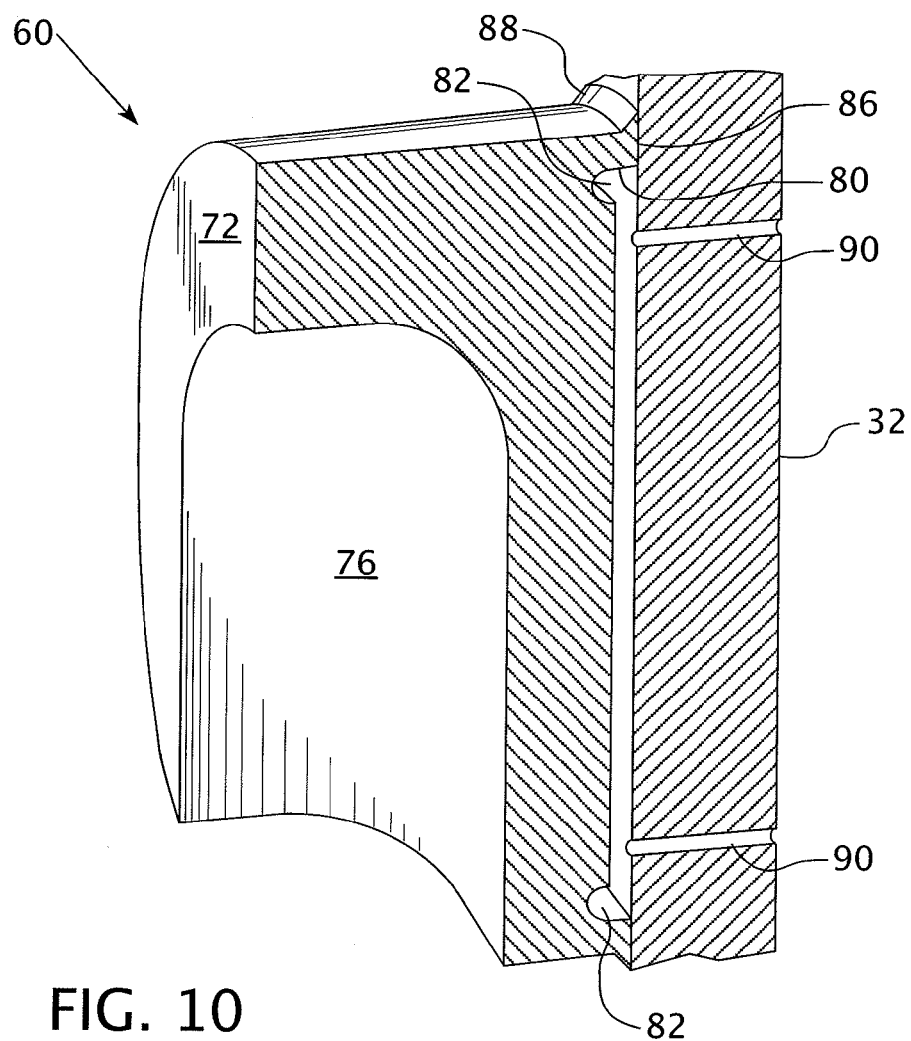
FIG. 10 is a perspective side cross-sectional view of the flow deflector of this invention coupled to the core barrel.

Details of this improved design are illustrated in FIGS. 9 and 10. FIG. 9 shows a perspective view of a cross-section of the deflector (60). The groove (82) that circumscribes the back side (78) of the deflector (60) that affords greater flexibility can be seen just inside of the machined relief protrusion (80). FIG. 9 also shows vent holes (90) in the flow deflector (60) which may be incorporated in the embodiment of this invention to relieve void volume pressure that may build up between the back of the deflector (60) and the core barrel (32). Alternatively the vent holes (90) can be provided in the core barrel as shown in FIG. 10.

The machined relief (80) provided on the back side (78) of the deflector (60) provides for flexibility near the weld joint (86) which can best be observed from FIG. 10, which shows a perspective side view cross-section of the flow deflector (60) attached to the core barrel (32). The weld attaching the machined relief (80) to the core barrel (32) is shown at (86) as a full penetration weld. This flexibility provided by the machined relief is needed to accommodate the thermal differential expansion of the flow deflector (60) relative to the core barrel (32) subsequent to a direct vessel injection fluid transient. This machined relief (80) can be described as the introduction of a flexible support or joint between two stiff members; i.e., the core barrel and the deflector. Thus, part of the thermal strain experienced by the contraction of the cylinder wall (outside diameter) of the flow deflector (60) can be accommodated by the 0.50" (1.27 cm) width (63) (shown in FIG. 11) of the wall of the deflector in bending. It should be noted that the machined back of the deflector (78) and the machined relief (80) are contoured to match the curvature of the core barrel (32) against which the relief (80) is joined.

The full penetration weld prep (84) for the relief (80) is shown in FIG. 11 as a machined J-groove weld preparation, though it should be appreciated that other weld preparation geometries can be employed. Preferably the weld extends completely around the periphery of the flow deflector where it contacts the core barrel. Though this embodiment uses a weld to secure the flow deflector to the core barrel it should be appreciated that other forms of joining the deflector to the core barrel can be employed. After welding the full penetration weld at the J-groove weld preparation to the core barrel (32), the wall thickness of the 0.346" (0.88 cm) offset (80) will be approximately 0.50" (1.27 cm). After completing the J-groove weld, a 0.25" (0.64 cm) reinforcing weld (88) may be used around the full penetration weld (86). The final weld geometry is illustrated in FIG. 10.

Accordingly, the improved design of the flow deflector (60) enables tire joint between the flow deflector and the barrel (32) to accommodate the relative differential expansion of the flow deflector and core barrel at their mating interface during a direct vessel injection transient.

While specific embodiments of the invention have been described in detail, it will be appreciated by those skilled in the art that various modifications and alternatives to those details could be developed in light of the overall teachings of the disclosure. For example, the flow deflector of this invention could be used in combination with any inlet nozzle to the pressure vessel and not just the direct vessel injection nozzle. Additionally it should be appreciated that the dimensions disclosed are exemplary and are not intended to limit the invention. Accordingly, the particular embodiments disclosed are meant to be illustrative only and not limiting as to the scope of the invention which is to be given the full breadth of the appended claims and any and all equivalents thereof.

What is claimed is:
1. A nuclear reactor comprising:
a pressure vessel having an axial dimension;
a fluid inlet nozzle extending through the wall of the pressure vessel;

an internal structure supported within the pressure vessel in spaced relationship with and opposite a pressure vessel interior side of said inlet nozzle; and a deflector positioned between the internal support structure and the fluid inlet nozzle, having a concave face in-line with the inlet nozzle, for deflecting substantially all of the fluid flowing through the inlet nozzle into the pressure vessel, the deflector having a main body with a front side facing the fluid inlet nozzle and a rear side facing the internal support structure, the rear side of the main body having at least one protrusion affixed to the internal support structure, so that a gap exists between the rear side of the main body adjacent the protrusion and the internal support structure.

2. The nuclear reactor of claim 1 wherein the protrusion is welded to the internal support structure.

3. The nuclear reactor of claim 2 wherein the protrusion is shaped as a "J" weld prep.

4. The nuclear reactor of claim 3 wherein a reinforcing weld is laid over the weld in the "J" weld prep.

5. The nuclear reactor of claim 4 wherein the reinforcing weld has a 0.25 in (0.64 cm) width.

6. The nuclear reactor of claim 2 wherein the weld that welds the protrusion to the internal support structure is a full penetration weld.

7. The nuclear reactor of claim 1 wherein the protrusion extends around a periphery of the rear side of the main body.

8. The nuclear reactor of claim 7 including a vent for relieving gas pressure that can build up between the rear side of the main body and the internal structure.

9. The nuclear reactor of claim 8 wherein the vent comprises a hole through the internal structure.

10. The nuclear reactor of claim 8 wherein the vent comprises a hole in the main body.

11. The nuclear reactor of claim 1 wherein the protrusion is approximately 0.5 in. (1.27 cm) in width.

12. The nuclear reactor of claim 1 wherein the protrusion is approximately 0.346 in. (0.88 cm) in height.

13. The nuclear reactor of claim 1 wherein the internal support structure is a reactor core barrel.

14. The nuclear reactor of claim 1 wherein the deflector is a metal block having an axial groove machined into its front side extending from below a top surface of the metal block to and through a bottom of the metal block.

15. The nuclear reactor of claim 14 wherein a periphery of the metal block is substantially round.

16. The nuclear reactor of claim 1 wherein the rear side of the deflector has a groove machined therein adjacent the protrusion.

17. The nuclear reactor of claim 16 wherein the groove is annular and extends around the main body inside the protrusion.

* * * * *